March 7, 1939.    D. W. ASHTON    2,149,411
TAMPERPROOF EAR TAGS
Filed Dec. 13, 1937
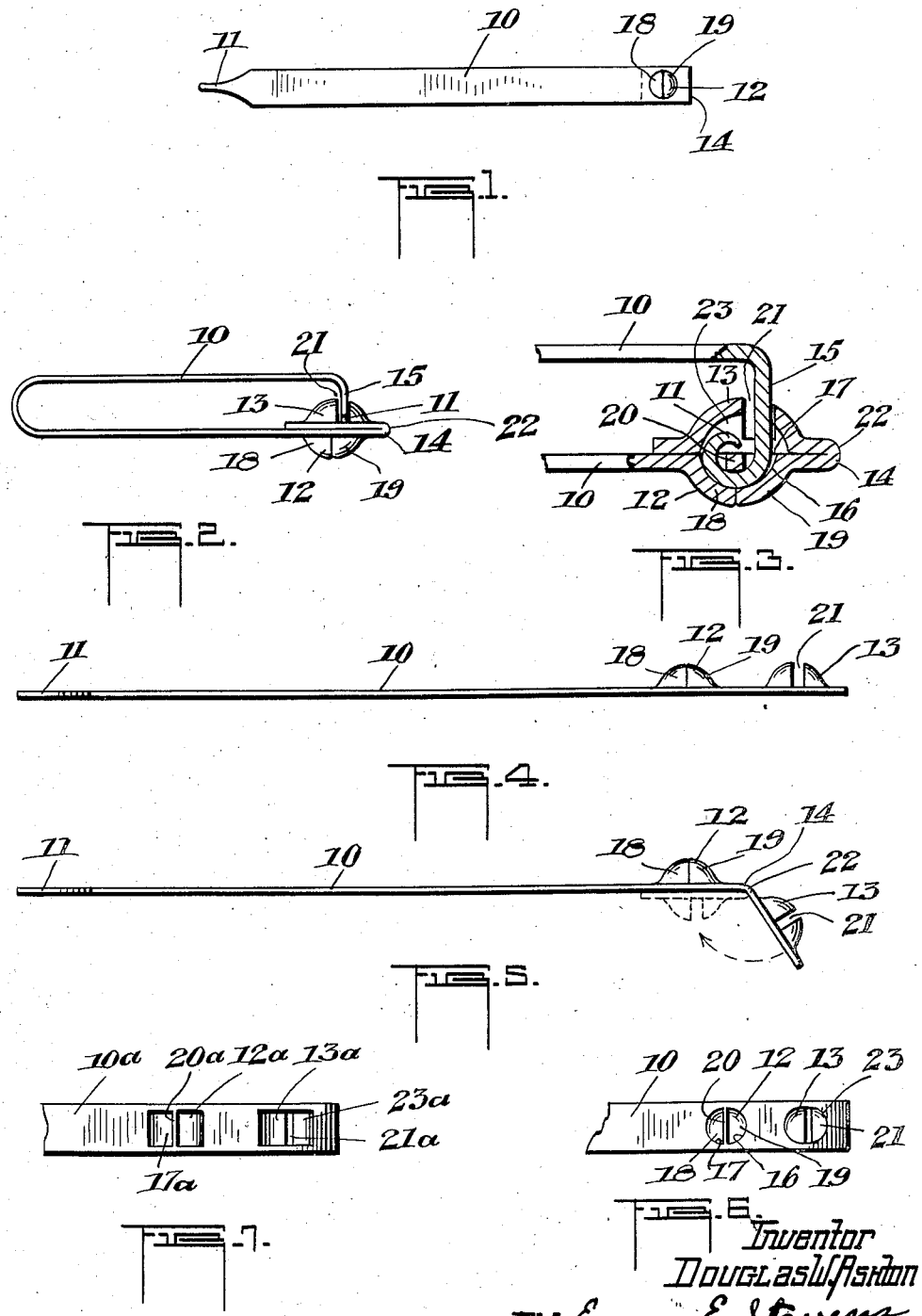
Inventor
Douglas W. Ashton
BY Eugene E. Stevens
Atty.

Patented Mar. 7, 1939

2,149,411

UNITED STATES PATENT OFFICE 2,149,411

TAMPERPROOF EAR TAG

Douglas W. Ashton, Ottawa, Ontario, Canada, assignor to J. O. Ker, Ottawa, Ontario, Canada Application December 13, 1937, Serial No. 179,598

3 Claims. (Cl. 40—3)

This invention relates to ear tags for animals and more particularly to a tamper-proof tag.

Marking tags for animals are widely used in order to identify specific animals, such as pedigreed animals and animals that have been examined and found to be disease-free. Tamper-proof tags are highly desirable for the reason that there have been many cases of false marking by interchanging the identification tag from one animal to another, as for instance changing the tag from a dead animal to a live one to represent the latter as other than it is. Moreover, where other than a tamper-proof tag is used, it would be possible to effect false registration in the case of pedigreed animals and to identify a diseased animal as one which had been tested and found to be free of disease.

In United States Patent No. 2,086,518 of July 13, 1937, granted to me and others, there is described a suitable type of tag which was devised with a view to avoiding difficulties as above set out.

According to the present invention I provide a similar type of tag which embodies an additional safeguard against tampering and which would appear to obviate even attempts to tamper with the tag. In general, the invention consists in a tag formed from a strip of material adapted to be bent upon itself and formed with a tapered locking tongue at one end and at the opposite end with a housing for receiving and locking the tongue, as described in the prior patent above referred to, and it also includes a construction wherein the housing is formed from the strip having an opening accessible from one side of the strip with an integral locking bar extending across the opening around which the locking tongue may extend when the tag has been clinched.

In the preferred form of this prior patent the parts of the housing separated by a slot of a width corresponding to the locking bar, were pressed together to finally form a closed housing over the locking bar. In the present invention there is provided, in addition to this construction, a second housing which is formed from a part of the strip in advance of the main housing, that part of the strip carrying the second housing, which might be termed an auxiliary housing, being bent so that the open side of the auxiliary housing overlies or substantially overlies the accessible opening of the main housing, the auxiliary housing being left with an open slot to receive the tapered end of the strip and to permit it to pass into the main housing and curl around the integral locking bar, the curled portion of the tongue and the locking bar being wholly enclosed by the main housing and the auxiliary housing, thus preventing instruments or the like being applied to the curled portion of the tag with a view to dislodging it.

The invention will be described in detail in the following specification taken in conjunction with the accompanying drawing.

In the drawing:—

Figure 1 is a top plan view of a tag in strip form.

Figure 2 is a side elevation of a clinched tag showing the disposition of the main and auxiliary housings.

Figure 3 is an enlarged fragmentary section of the clinched tag showing principally the construction of the housings and the manner in which the tongue is clinched around the locking bar and encased by the housings.

Figure 4 is a side elevation of a tag according to the present invention, in strip form.

Figure 5 is a similar view to Figure 4 but showing the end of the tag carrying the auxiliary housing in the process of being bent, the normal operative position of the auxiliary housing being shown in dotted lines.

Figure 6 is a fragmentary bottom plan view of one end of the tag prior to bending, showing the relation of the main and auxiliary housing and the openings thereto.

Figure 7 is a fragmentary bottom plan view of part of a tag in strip form, showing an alternative shape of housing.

Referring to the drawing, 10 indicates a tag made up of strip material, preferably metal, formed with a tapered locking tongue 11 at one end and an integral depressed portion or main housing 12 at the opposite end designed to receive the tongue when the tag is clinched. In the present construction the main housing 12 is spaced somewhat from the end of the tag in which it is formed and adjacent to the extremity of this end of the tag an auxiliary housing 13 is formed. The tag is normally designed to be bent upon itself as at 14 and the tongue is normally designed to be bent substantially at right angles to the strip, as indicated at 15, to project towards the housing 12.

The housing 12 is formed in the same manner as disclosed in the prior United States patent above referred to, having continuously curved or sloped walls 16 for the purpose of deforming the tongue when the tag is clinched, it being understood of course that the term "sloped" is designed to define an inclined or curved wall. In the formation of the main housing 12, it is pressed from the strip to provide an accessible opening 17 while the pressing operation is done by means of a die in such a way that it will press and cut the strip to form the housing in two sections 18 and 19 so as to leave an integral locking bar 20 extending across the opening 17. At the same time, or afterwards if desired, the two sections 18 and 19 of the housing are brought together to form the closed main housing 12, as illustrated, completely encasing the locking bar 20 from one side of the strip.

The auxiliary housing 13 is pressed from the strip in a substantially similar manner and is cut so as to provide a slot 21 of a suitable width and preferably disposed a little to one side of the middle of the housing so that when the strip is bent at a point between the two housings, as indicated at 22, to position the auxiliary housing 13 directly over the main housing 12, the slot 21 will permit the tongue 11 of the tag to enter the auxiliary housing 13 and to engage the inner wall of the main housing 12 to one side of the locking bar 20. Thus, in the clinching operation, the tongue 11, after passing through the slot 21 into engagement with the inner wall of the housing 12, will curl around the integral locking bar 20.

It will be noted that when the tag is applied the opening 23 in the strip below the auxiliary housing 13 directly overlies or substantially overlies the opening 17 to the main housing 12 and, apart from a small opening which may occur between part of the tag and the defining edges of the slot 21 through which it would be impossible to insert any practical instrument, the tongue is completely encased once clinched.

In Figure 7 a portion of a similar type of tag is shown with the exception that the strip 10a is formed with a main housing 12a rectangular in shape, the auxiliary housing 13a being also of rectangular shape, the main housing being provided with an opening 17a and a cross bar 20a integral with the strip and extending across the opening while the auxiliary housing is provided with a slot 21a through which the locking tongue passes into the main housing. It will be appreciated, therefore, that the housings for the tag are not confined to one shape.

The tag so formed will resist any practical methods that might be employed to tamper with it. The tongue is projected into the main housing on that side of the integral locking bar nearest to the end of the tag in which the housing is formed. Thus, any attempts to bend that end of the tag so as to spread apart the closed main housing are resisted by contact between a part of the auxiliary housing and that part of the tag adjacent to the curled tongue, while the forward portion of the main housing will also contact with the curled tongue to likewise resist such an effort. Any attempt to insert a tool under the free end of the tag adjacent the auxiliary housing and to bend the latter away would be resisted by contact between the auxiliary housing and that part of the tag adjacent to the curled tongue and, if it is possible to bend up this part of the tag, the extent to which it might be bent is so limited that no practical tool could be inserted into the housing, as is the case if attempts were made to insert a tool in the slot of the auxiliary housing.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:—

1. A tamper-proof marking tag comprising a strip of material adapted to be bent upon itself, formed with a tapered locking tongue at one end and with a main housing and an auxiliary housing at the opposite end and adjacent to each other, said main housing having an opening accessible from one side of the strip through which the tongue may be projected, said tongue being normally bent substantially at right angles to the strip and positioned above and projecting towards said main housing, the latter having a sloped wall to deform said tongue when engaged thereby, said strip having a locking bar extending across the opening to the said main housing around which said tongue may curl when deformed, said strip being bent intermediate the main and auxiliary housings so that the latter overlies the former, said auxiliary housing having a slot therein permitting the locking tongue to pass therethrough into the main housing, the said main and auxiliary housings together wholly encasing so as substantially to seal the locking bar and curled portion of the tongue when the tag is clinched.

2. A tamper-proof marking tag comprising a strip of material adapted to be bent upon itself, formed with a tapered locking tongue at one end, and with a main housing and an auxiliary housing at the opposite end and adjacent to each other, said main housing having an opening accessible from one side of the strip through which the tongue may be projected, said tongue being normally bent substantially at right angles to the strip and positioned above and projecting towards said main housing, the latter having a sloped wall to deform said tongue when engaged thereby, said strip having an integral locking bar extending across the opening to the said main housing around which said tongue may curl when deformed, said strip being bent intermediate the main and auxiliary housings so that the latter overlies the former, said auxiliary housing having a slot therein permitting the locking tongue to pass therethrough into the main housing, the said main and auxiliary housings together wholly encasing so as substantially to seal the locking bar and curled portion of the tongue when the tag is clinched.

3. A tamper-proof marking tag comprising a strip of material adapted to be bent upon itself, formed with a tapered locking tongue at one end, and with a main housing and an auxiliary housing at the opposite end and adjacent to each other, said main housing being formed in two parts brought into engagement with one another to form a continuous defining wall for the housing and having an opening accessible from one side of the strip, said tongue being normally bent substantially at right angles to the strip and positioned above and projecting towards said main housing, the latter having a sloped wall to deform said tongue when engaged thereby, said strip having an integral locking bar extending across the opening to the main housing around which said tongue may curl when deformed during a clinching operation, said strip being bent intermediate the main and auxiliary housings so that the latter overlies the former, said auxiliary housing having a slot therein permitting the locking tongue to pas therethrough into the main housing, the said main and auxiliary housings together wholly encasing so as substantially to seal the locking bar and curled portion of the tongue when the tag is clinched.

DOUGLAS W. ASHTON.